United States Patent
Nishiura

(10) Patent No.: US 7,403,634 B2
(45) Date of Patent: Jul. 22, 2008

(54) OBJECT TRACKING APPARATUS AND METHOD

(75) Inventor: Masahide Nishiura, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1000 days.

(21) Appl. No.: 10/435,259

(22) Filed: May 12, 2003

(65) Prior Publication Data

US 2003/0219147 A1   Nov. 27, 2003

(30) Foreign Application Priority Data

May 23, 2002   (JP)   ............ P2002-148536

(51) Int. Cl.
*G06K 9/00* (2006.01)
(52) U.S. Cl. ............... 382/103; 382/218; 348/169
(58) Field of Classification Search ........ 382/209, 382/103, 107, 241, 219, 218; 348/169, 208.1, 348/699
See application file for complete search history.

(56) References Cited

U.S. PATENT DOCUMENTS

| | | | | |
|---|---|---|---|---|
| 5,214,751 | A | * | 5/1993 | Robert .................. 345/606 |
| 5,764,283 | A | * | 6/1998 | Pingali et al. ........... 348/169 |
| 5,982,909 | A | * | 11/1999 | Erdem et al. ........... 382/103 |
| 6,724,915 | B1 | * | 4/2004 | Toklu et al. ............. 382/103 |
| 6,784,927 | B1 | * | 8/2004 | Itokawa ................ 348/208.1 |
| 6,839,465 | B2 | * | 1/2005 | Kaneko et al. ........... 382/190 |
| 6,968,004 | B1 | * | 11/2005 | Hori et al. ............ 375/240.01 |
| 7,085,418 | B2 | * | 8/2006 | Kaneko et al. ........... 382/219 |

FOREIGN PATENT DOCUMENTS

| | | |
|---|---|---|
| JP | 2000-194861 | 7/2000 |
| JP | 2001-357403 | 12/2001 |
| JP | 2002-357403 | 12/2001 |

* cited by examiner

*Primary Examiner*—Matthew C Bella
*Assistant Examiner*—Claire Wang
(74) *Attorney, Agent, or Firm*—Finnegan, Henderson, Farabow, Garrett & Dunner, L.L.P.

(57) ABSTRACT

An image input device inputs image sequence data. A memory stores each image of the image sequence data. A tracking point indication unit initially indicates a plurality of tracking points on a first image stored in the memory. A pattern matching unit compares a pattern of each tracking point of the first image with a second image stored in the memory, and detects a plurality of destination candidate points from the second image, each corresponding to each tracking point. A position inconsistency correction unit decides whether a positional relation of the plurality of destination candidate points is consistent with a positional relation of the plurality of tracking points, and corrects at least one of the plurality of destination candidate points on the second image if the positional relation of the plurality of destination candidate points is inconsistent with the positional relation of the plurality of tracking points.

23 Claims, 10 Drawing Sheets

OBJECT TRACKING APPARATUS AND METHOD

CROSS-REFERENCE TO RELATED APPLICATIONS

This application is based upon and claims the benefit of priority from the prior Japanese Patent Application P2002-148536, filed on May 23, 2002; the entire contents of which are incorporated herein by reference.

FIELD OF THE INVENTION

The present invention relates to an object tracking apparatus and a method for tracking an object in each frame of image sequence data.

BACKGROUND OF THE INVENTION

In an image monitoring system or a medical image analysis system, a technique to track an object (a vehicle or an internal organ) in image sequence data is important. As a prior art, a tracking method in Japanese Patent Disclosure (Kokai) 2001-357403 is explained. First, a plurality of tracking points are initially set for a vehicle to be tracked. A movement of each tracking point is examined by using a template matching, and a weighted sum of a moving vector of each tracking point is calculated by using a residual of the matching. This weighted sum represents a moving vector of the vehicle. Next, a location of the vehicle is calculated from the moving vector of the vehicle. Last, by using Kalman filter for the location of the vehicle, a moving status (a location and a direction of movement) of the vehicle in actual space is estimated. In this way, the object is sequentially tracked. Hereinafter, this method is called a prior method.

In the case that the object is a rigid body, such as a vehicle, and the deformation is the same way as the prior method, a plurality of points in the object are tracked by using the template matching. In this case, the tracking result of the object is sufficiently reliable.

However, in the case that an deformable object, such as a person's facial image or a heart image in medical area is tracked, i.e., in the case that non-rigid body is the object to be tracked, each tracking point of the object may differently move by deformation of the object. Briefly, movement of the tracking points is not uniformed. In other words, a positional relation among a plurality of tracking points is changed by deformation of the object. Accordingly, in the prior method, by passage of time, it is often happened that a positional relation of a plurality of tracking point is inconsistent, and the tracking result of the object is not reliable.

SUMMARY OF THE INVENTION

The present invention is directing to an object tracking apparatus and a method for correctly tracking a plurality of points of the object as non-rigid body without positional inconsistency of the plurality of points.

According to an aspect of the present invention, there is provided an object tracking apparatus, comprising: an image input device inputting image sequence data; a memory storing each image of the image sequence data; a tracking point indication unit configured to initially indicate a plurality of tracking points on a first image stored in said memory; a pattern matching unit configured to compare a pattern of each tracking point of the first image with a second image stored in said memory, and to detect a plurality of destination candidate points each corresponding to each tracking point from the second image; and a position inconsistency correction unit configured to decide whether positional relation of the plurality of destination candidate points is consistent with positional relation of the plurality of tracking points, and to correct at least one of the plurality of destination candidate points on the second image if the positional relation of the plurality of destination candidate points is inconsistent with the positional relation of the plurality of tracking points.

According to other aspect of the present invention, there is also provided an object tracking apparatus, comprising: an image input device inputting image sequence data; a memory storing each image of the image sequence data; a tracking point indication unit configured to initially indicate a plurality of tracking points on a first image stored in said memory; a pattern matching unit configured to compare a pattern of each tracking point of the first image with a second image stored in said memory, and to detect a plurality of destination candidate points each corresponding to each tracking point from the second image; a parameter calculation unit configured to calculate an observed value of affine parameter by using coordinate data of the plurality of destination candidate points and the plurality of tracking points; a parameter status estimation unit configured to estimate affine parameter of the plurality of tracking points from the first image to the second image by using the observed value of affine parameter; and a coordinate value calculation unit configured to calculate a coordinate value of a destination point of each tracking point on the second image by using the estimated affine parameter.

According to still other aspect of the present invention, there is also provided an object tracking apparatus, comprising: an image input device inputting image sequence data; a memory storing each image of the image sequence data; a tracking area indication unit configured to initially indicate a tracking area on a first image stored in said memory; an optimal parameter search unit configured to respectively deform the tracing area by using a plurality of affine parameters, to compare each deformed tracking area with a corresponding area of a second image stored in said memory, and to select the affine parameter used for the deformed tracking area matched with the corresponding area from the plurality of affine parameters; a parameter status estimation unit configured to estimate affine parameter of the tracking area from the first image to the second image by using the selected affine parameter; and a coordinate value calculation unit configured to calculate a coordinate value of a destination area of the tracking area on the second image by using the estimated affine parameter.

According to still other aspect of the present invention, there is also provided an object tracking method, comprising: inputting image sequence data; storing each image of the image sequence data in a memory; initially indicating a plurality of tracking points on a first image stored in the memory; comparing a pattern of each tracking point of the first image with a second image stored in the memory; detecting a plurality of destination candidate points each corresponding to each tracking point from the second image; deciding whether positional relation of the plurality of destination candidate points is consistent with positional relation of the plurality of tracking points; and correcting at least one of the plurality of destination candidate points if the positional relation of the plurality of destination candidate points is inconsistent with the positional relation of the plurality of tracking points.

According to still other aspect of the present invention, there is also provided an object tracking method, comprising: inputting image sequence data; storing each image of the image sequence data in a memory; initially indicating a plurality of tracking on a first image stored in the memory; comparing a pattern of each tracking point of the first image with a second image stored in the memory; detecting a plurality of destination candidate points each corresponding to each tracking point from the second image; calculating an observed value of affine parameter by using coordinate data of the plurality of destination candidate points and the plurality of tracking points; estimating affine parameter of the plurality of tracking points from the first image to the second image by using the observed value of affine parameter; and calculating a coordinate value of a destination point of each tracking point on the second image by using the estimated affine parameter.

According to still other aspect of the present invention, there is also provided an object tracking method, comprising: inputting image sequence data; storing each image of the image sequence data in a memory; initially indicating a tracking area on a first image stored in the memory; respectively deforming the tracking area by using a plurality of affine parameters; comparing each deformed tracking area with a corresponding area of a second image stored in the memory; selecting the affine parameter used for the deformed tracking area matched with the corresponding area from the plurality of affine parameters; estimating affine parameter of the tracking area from the first image to the second image by using the selected affine parameter; and calculating a coordinate value of a destination area of the tracking area on the second image by using the estimated affine parameter.

According to still other aspect of the present invention, there is also provided a computer program product, comprising: a computer readable program code embodied in said product for causing a computer to track an object in image sequence data, said computer readable program code comprising: a first program code to input the image sequence data; a second program code to store each image of the image sequence data in a memory; a third program code to initially indicate a plurality of tracking points on a first image stored in the memory; a fourth program code to compare a pattern of each tracking point of the first image with a second image stored in the memory; a fifth program code to detect a plurality of destination candidate points each corresponding to each tracking point from the second image; a sixth program code to decide whether positional relation of the plurality of destination candidate point is consistent with positional relation of the plurality of tracking points; and a seventh program code to correct at least one of the plurality of destination candidate points if the positional relation of the plurality of destination candidate points is inconsistent with the positional relation of the plurality of tracking points.

DETAILED DESCRIPTION OF THE EMBODIMENTS

Figure 1:
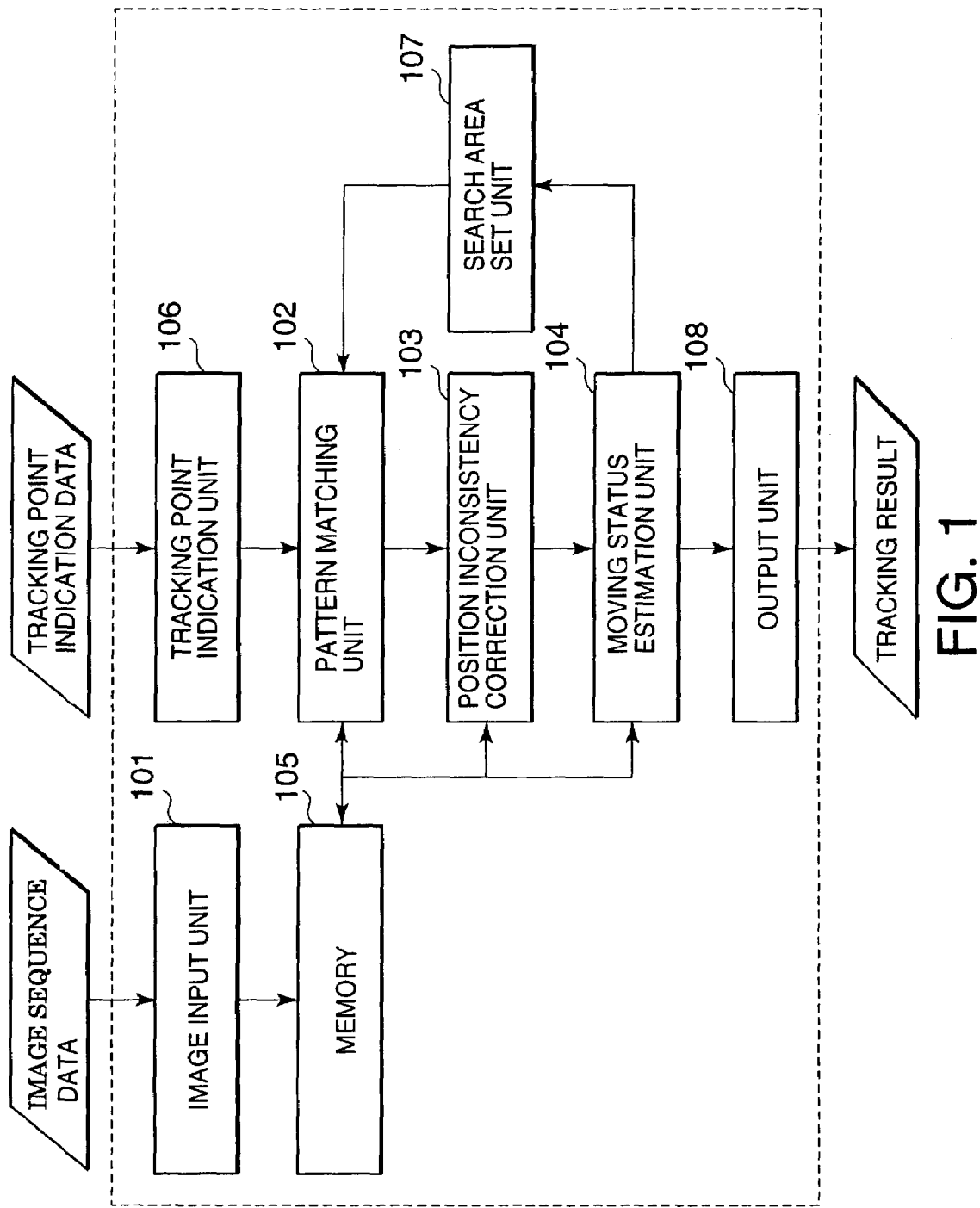
FIG. 1 is a block diagram of the object tracking apparatus according to a first embodiment of the present invention.

Hereinafter, various embodiments of the present invention will be explained by referring to the drawings.

First Embodiment

In the object tracking apparatus of the first embodiment, image sequence data output from a personal computer (PC) and a workstation (WS), and coordinate data of a plurality of tracking points, are input. In response to this input, movement of each tracking point is tracked at a predetermined interval, and a coordinate or a velocity of each tracking point is output as the tracking result at the predetermined interval to the PC or WS. Especially, the object tracking apparatus has a function to track the movement of a plurality of points of a non-rigid body as a deformable object by movement. For example, in the case of obtaining a image sequence of the heart, the movement of arbitrary points of the heart can be correctly tracked. Hereinafter, in order to simplify the explanation, a two-dimensional image as an example is explained. However, the present apparatus can process other images, such as a three-dimensional image.

FIG. 1 is a block diagram of the object tracking apparatus according to the first embodiment. As shown in FIG. 1, the object tracking apparatus includes an image input unit 101 to input image sequence data, a memory 105 to store the input image and information such as tracking points, a tracking point indication unit 106 to input a plurality of tracking points in response to indication from a user, and a pattern matching unit 102 to respectively extract a destination candidate point of each tracking point from the image by pattern matching. Furthermore, the object tracking apparatus includes a position inconsistency correction unit 103, a moving estimation unit 104, a search unit 107, and an output unit 108. The position inconsistency correction unit 103 detects an inconsistency of the positional location of the destination candidate points and to correct the inconsistency. The moving status estimation unit 104 estimates a moving status vector at a timing when a current image is obtained and to predict a moving status vector at a timing when a next image will be obtained. The search area set unit 107 creates a weight as a statistic quantity used for extraction of the destination candidate point by a prediction value of the moving status vector on the next image and to set a search area by the weight. The output unit 108 outputs the estimation result (tracking result) through the PC or WS. The moving status represents information of a coordinate, a velocity and an acceleration of the tracking point, and the moving status vector represents a vector quantity including these information as each element. In the first embodiment, the moving status vector includes all of the coordinate, the velocity and the acceleration for the tracking point. However, all information is not necessary by design of the apparatus. For example, the moving status vector may include only the coordinate for the tracking point in other embodiments of the present invention.

The image input unit 101 receives input of the image sequence data from outside and makes the memory 105 sequentially store each frame of the image sequence data.

The memory 105 stores the image sequence data, a template image, information of each tracking point, information of positional relation between the tracking points and so on. The memory 105 can be accessed by the image input unit 101, the pattern matching unit 102, the position inconsistency correction unit 103 and the moving status estimation unit 104.

The tracking point indication unit 106 receives an input of coordinate data of a plurality of tracking points from the outside, and sends the coordinate data to the pattern matching unit 102.

The pattern matching unit 102 searches the moving candidate point of each tracking point by using template matching. Concretely, the pattern matching unit 102 reads image data of a current image and a template image of each tracking point, and searches the highest correlation point with the template image of each tracking point from the current image by using the weight output from the search area set unit 107. In this way, a coordinate of the destination candidate point of each tracking point is determined and stored in the memory 105. The template image used for template matching is created by the pattern matching unit 102 when the coordinate data of each tracking point is received from the tracking point indication unit 106. This template image is also stored in the memory 105.

The position inconsistency correction unit 103 decides whether a positional relation of the destination candidate point of each tracking point is consistent with the original positional relation of each tracking point. Concretely, the position inconsistency correction unit 103 reads the coordinate of the destination candidate point of each tracking point and information of the original positional relation of each tracking point from the memory 105. Then, as explained afterwards, in the case that the information of the original positional relation does not exist in the memory 105, the position inconsistency correction unit 103 detects the original positional relation of each tracking point. In the case that the information of positional relation exists in the memory 105, the position inconsistency correction unit 103 decides whether the positional relation of the destination candidate point of each tracking point is consistent with the original positional relation of each tracking point. As for a tracking point at which the inconsistency is detected, the position inconsistency correction unit 103 searches the destination candidate point of the tracking point again from the current image. After the decision of inconsistency and the second search are completed for all tracking points, the coordinate of the destination candidate point of each tracking point is stored in the memory 105.

The moving status estimation unit 104 reads the coordinate of the destination candidate point of each tracking point on the current image from the memory 105, estimates a moving status vector of each tracking point on the current image and predicts a moving status vector of each tracking point on a next image. As explained afterwards, estimation and prediction of the moving status vectors are typically executed by using a Kalman filter. The estimated moving status vector of each tracking point of the current image is sent to the output unit 108, and the predicted moving status vector of each tracking point of the next image is sent to the search area set unit 107.

The search area set unit 107 calculates the weight of the next image for pattern matching by using the predicted moving status vector of each tracking point of the next image output from the moving status estimation unit 104, and sends the weight of the next image to the pattern matching unit 102. In the first embodiment, the weight of each pixel in the search area is set by "1" and the weight of each pixel outside the search area is set by "0".

The output unit 108 receives the moving status vector of each tracking point of the current image from the moving status estimation unit 104, and outputs the moving status vector through the outside PC or WS.

Figure 2:
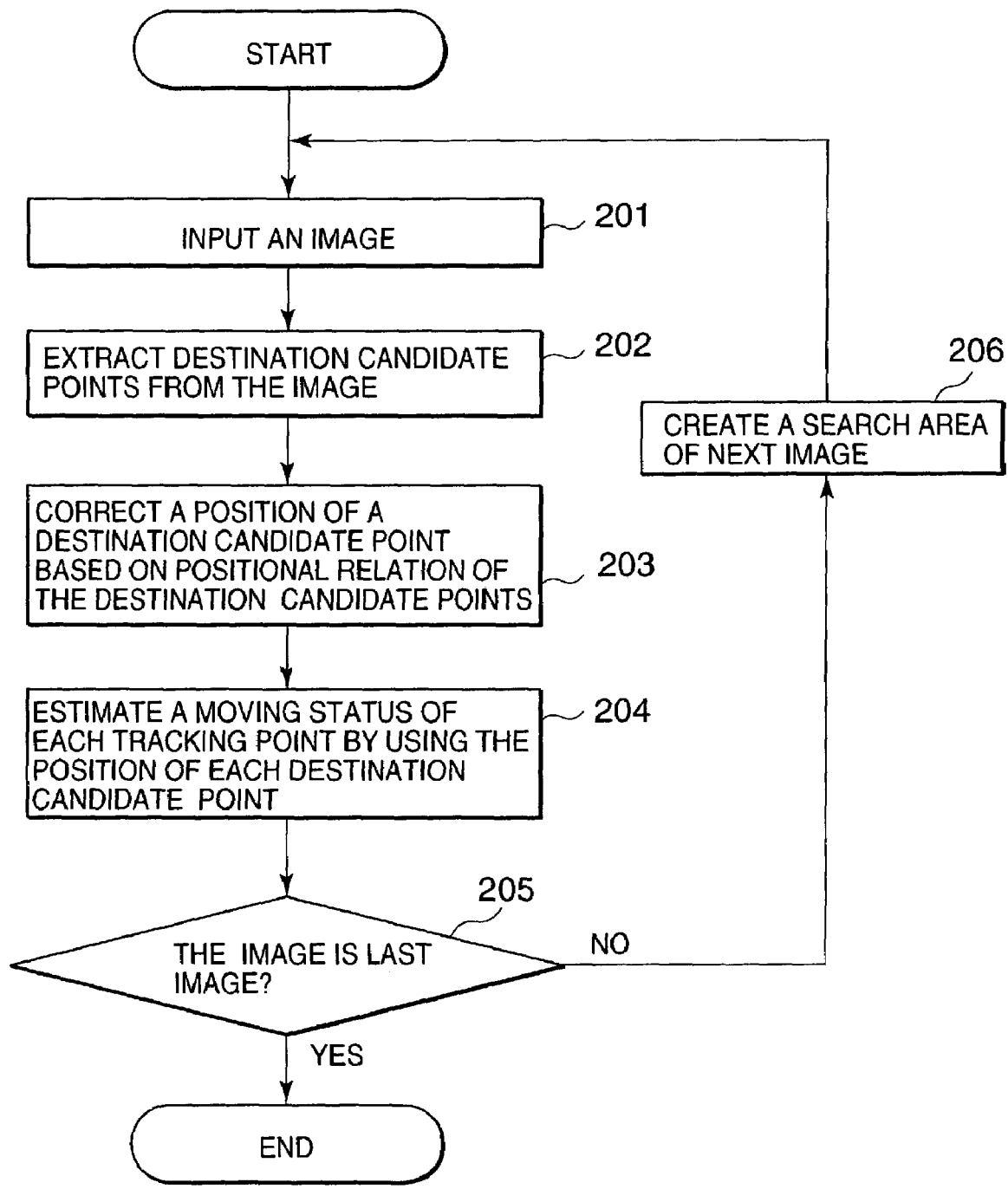
FIG. 2 is a flow chart of processing of the object tracking apparatus according to the first embodiment of the present invention.

FIG. 2 is a flow chart of processing of the object tracking apparatus according to the first embodiment. In this case, assume that the initial coordinate of each tracking point is provided at a timing of operation starting.

First, image data of each frame is obtained from image sequence data input from outside and stored in the memory 105 (step 201). Then, a coordinate of destination candidate point of each tracking point is extracted from the current image (current frame) by using template matching (step 202). Next, it is decided whether the positional relation of the destination candidate points is consistent with the original positional relation of the tracking points. In the case of detecting a tracking point of inconsistency, the destination candidate point of the tracking point is searched again (corrected) on the current image (step 203). The moving status vector of each tracking point on the current image is estimated by using the coordinate of the destination candidate point and a Kalman filter (step 204). Furthermore, the moving status vector of each tracking point on the next image is predicted by using the moving status vector of each tracking point on the current image and the Kalman filter. The moving status vector of each tracking point on the current image is output to the outside. After tracking processing is executed for all images (all frames), the tracking processing is completed (step 205). On the other hand, in the case that a next frame exists, the search area (weight) of the next image for template matching is calculated by using the predicted moving status vector of each tracking point of the next image (step 206), and processing of step 201 is executed.

FIGS. 3A, 3B, 3C and 3D are schematic diagrams showing a method for detecting an inconsistency of a positional relation of a destination candidate point of each tracking point and a method for correcting a tracking point from which the inconsistency of the positional relation is occurred.

Figure 3A:
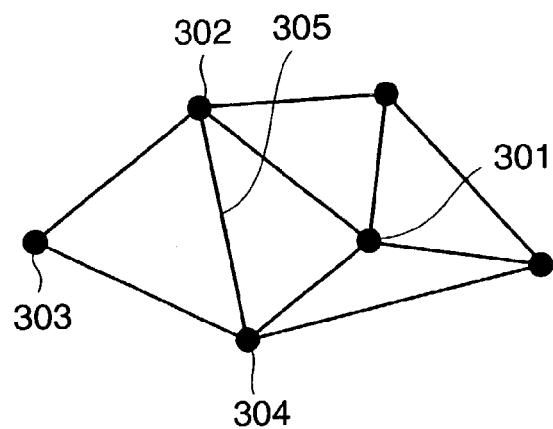
FIG. 3A is a schematic diagram of initial positional relation of a plurality of exemplary tracking points.

First, as shown in FIG. 3A, each triangle patch is formed by neighboring three tracking points on a first input image, and a positional relation of each tracking point is stored in the memory 105. In the first embodiment, an identification number is added to each tracking point, and a triangle patch is put on each area formed by neighboring three tracking points by the generation method of a Delaunay triangle. Then, as for each edge of each triangle, the identification number of the tracking point facing the edge is stored in the memory 105. Except for the case that the edge of the triangle is an outline of a polygon formed by all triangles, two triangles are neighbored by a common edge. Accordingly, two tracking points (vertexes) exist by facing the common edge. In order to detect an inconsistency of the positional relation, it is decided whether two vertexes (coordinates of two destination candidate points) facing the common edge of two triangles are respectively located at the right side and the left side in the same way as in the respective original side of two tracking points. As for an edge of the triangle which is the outline of the polygon formed by all triangles, information that a vertex facing the edge is located at which side (the right side or the left side) of the edge is stored, and the inconsistency of the positional relation is decided by using the information.

In order to verify the positional relation of the right side and the left side, an outer product of an edge vector and a vertex vector is used. By setting a starting point and an end point of each edge, the right side and the left side are defined based on a vector (edge vector) from the starting point to the end point. An outer product between the edge vector and a vector (vertex vector) from the starting point to the vertex is calculated.

In the first embodiment, a two-dimensional image is used as an example image. Accordingly, the outer product between the edge vector and the vertex vector is a vector including only an element along a Z axis (a normal line on the two-dimensional image). If the vertex is located at the left side of the edge vector, the element along Z axis is a positive value. If the vertex is located of the right side of the edge vector, the element along Z axis is a negative value. As for data to be stored for each common edge of two neighboring triangles in the memory 105, the identification numbers of the starting point and the end point of the edge vector, the identification number of the vertex facing the edge, and which side (the right side or the left side) of the edge vector at which the vertex is located, are included.

Hereinafter, in FIG. 3A, an exemplary method for extracting the positional relation is explained as an example of a first triangle formed by three tracking points 301, 302, 304 and a second triangle formed by three tracking points 302, 303, 304. An edge (side) 305 connected between two tracking points 302 and 304 is a common edge of the first triangle and the second triangle. A tracking point 301 and a tracking point 303 are respectively vertexes facing the edge 305. In order to briefly explain, a coordinate of each tracking point is set. Assume that the tracking point 301 is (6,3), the tracking point 302 is (3,4), the tracking point 303 is (1,2), and the tracking point 304 is (4,1). Now, a vector on two-dimensional plane (X-Y plane) is considered and X-Y elements of the outer product is respectively "0". Accordingly, the outer product is not represented as a vector.

First, an outer product (first outer product) between a vector from a starting point 304 to an end point 302 and a vector from a starting point 304 to an end point 301 is calculated. The vector from the starting point 304 to the end point 302 is calculated as follows.

$$(3,4)-(4,1)=(-1,3)$$

The vector from the starting point 304 to the end point 301 is calculated as follows.

$$(6,3)-(4,1)=(2,2)$$

Accordingly, the first outer product is calculated as follows.

$$(-1,3)\times(2,2)=(-1)\times 2-3\times 2=-8$$

In the same way, an outer product (second outer product) between a vector from a starting point 304 to an end point 302 and a vector from a starting point 304 to an end point 303 is calculated. The vector from the starting point 304 to the end point 302 is calculated as follows.

$$(3,4)-(4,1)=(-1,3)$$

The vector from the starting point 304 to the end point 303 is calculated as follows.

$$(1,2)-(4,1)=(-3,1)$$

Accordingly, the second outer product is calculated as follows.

$$(-1,3)\times(-3,1)=(-1)\times 1-3\times(-3)=8$$

The first outer product is a negative value, and it is decided that the tracking point 301 is located at the right side of the vector from the starting point 302 to the end point 304. On the other hand, the second outer product is a positive value, and it is decided that the tracking point 303 is located at the left side of the vector from the starting point 302 to the end point 304. Accordingly, in this example, information that "A starting point of the edge is a tracking point 304", "An end point of the edge is a tracking point 302", "A tracking point 301 is located at the right side of the edge", "A tracking point 303 is located at the left side of the edge", is stored as the original positional relation among the tracking points.

Next, after destination candidate points each corresponding to each tracking point are extracted, a positional relation among the destination candidate points is verified. Hereinafter, verification of the positional relation is explained. In FIG. 3A, the first triangle formed by the base 305 connected between two tracking points 302 and 304 and a vertex as the tracking point 301, and the second triangle formed by the same base 305 and another vertex as the tracking point 303, exist. In other words, each vertex of two triangles is respectively located at both sides of the base 305. Briefly, the tracking point 301 and the tracking point 303 are mutually located at the opposite side for a straight line passing through two tracking points 302 and 304. In general, an object is not cut and divided. Furthermore, the object does not locally deform in comparison with the spatial density of the tracking point. Accordingly, the positional relation among the tracking points of the object is maintained while the object is moving. This assumption is generally applied to an object deformable (a non-rigid object) such as the heart.

Figure 3B:
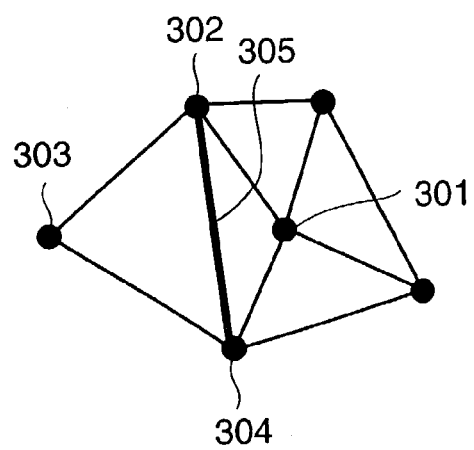
FIG. 3B is a schematic diagram of positional relation of a plurality of exemplary destination candidate points without positional inconsistency.

As shown is FIG. 3B, after destination candidate points each corresponding to each tracking point are extracted from a current image, assume that a triangle patch is put among neighboring three destination candidate points by using the original positional relation shown in FIG. 3A. An outline of a polygon formed by all triangles shown in FIG. 3B deforms compared with an outline of a polygon formed by all triangles shown in FIG. 3A. However, as for two triangles of the common base 305 and two vertexes 301 and 303, each vertex of the two triangles is located at both sides (the right side and the left side) of the base 305. This positional relation is consistent with the original positional relation shown in FIG. 3A.

Figure 3C:
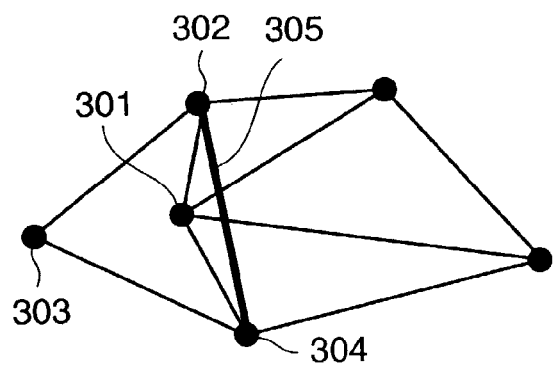
FIG. 3C is a schematic diagram of positional relation of the plurality of exemplary destination candidate points with positional inconsistency.
Figure 3D:
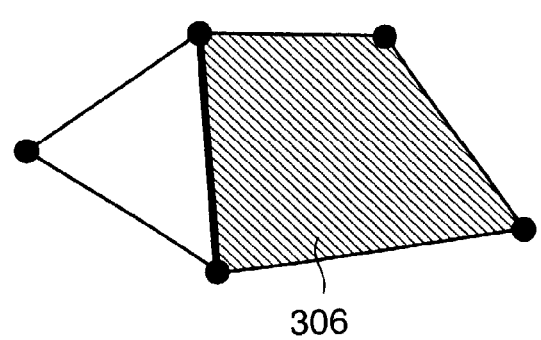
FIG. 3D is a schematic diagram of a search area to correct a position of the exemplary destination candidate point.

On the other hand, as shown in FIG. 3C, after the destination candidate points each corresponding to each tracking point are extracted from the current image, assume that a triangle patch is put among neighboring three destination candidate points. As for two triangles of the common base 305 and two vertices 301 and 303, each vertex of the two triangles is located at the left side of the base 305. This positional relation is inconsistent with the original positional relation shown in FIG. 3A. In this case, a destination candidate point corresponding to the tracking point is searched again. In FIG. 3C, inconsistency of the positional relation is caused by the tracking point 301. Accordingly, as shown in FIG. 3D, a new tracking point is searched using pattern matching from area 306 in which inconsistency of the positional relation is not caused by the new tracking point. Instead of pattern matching, a coordinate of the destination candidate point may be interpolated using the positional relation of tracking points as vertexes of the area 306. (In this case, a template image of the tracking point 301 is updated in the memory 105.)

Next, in the moving status estimation unit 104, estimation processing of a moving status vector of each tracking point on a current image and prediction processing of a moving status vector of each tracking point on a next image are explained. In general, a Kalman filter is a linear probability system and used for estimation and prediction of the moving status vector. The relational equation of the Kalman filter is represented as follows.

$$P_{n+1} = F_n P_n + G_n \omega_n \quad (1)$$

$$r_n = H_n P_n + v_n \quad (2)$$

$$(n = 0, 1, 2, \ldots)$$

In above equation (1), "$r_n$" is vector quantity of which element includes error caused by observation of timing n. Hereinafter, this vector quantity is called an observation value. "$P_n$" is a status vector of timing n. "$H_n$" is an observation matrix representing a relationship between the status vector and the observation value. "$F_n$" is a status transition matrix to predict next status vector "$P_{n+1}$" from the status vector "$P_n$". "$\omega_n$" and "$v_n$" are respectively a Gaussian vector of white noise. "$G_n$" is a matrix to affect the Gaussian vector of white noise on the status vector.

As mentioned-above, $r_n$ is the observed value and $P_n$ is estimation value of a true value. In general, when the true value $P_n$ is observed, the observed value $r_n$ different from the true value is obtained by effect of the error. By using the Kalman filter, the true value $P_n$ can be estimated from the observed value $r_n$. Furthermore, $P_{n+1}$ is next true value predicted from the true value $P_n$. In the first embodiment, $P_n$ is a moving status vector estimated at a timing when an image of n-th frame is obtained. In one embodiment, this moving status vector includes X-coordinate and Y-coordinate of the tracking point, a velocity element along X-direction and Y-direction, an acceleration element along X-direction and Y-direction. On the other hand, $r_n$ is a vector quantity observed from the image of n-th frame. In one embodiment, this vector quantity includes X-coordinate and Y-coordinate of a destination candidate point corresponding to the tracking point. The status transition matrix $F_n$ is guided, from a movement model of the object. In the first embodiment, for example, the status transition matrix can be determined based on a movement model of equal acceleration.

Figure 4:
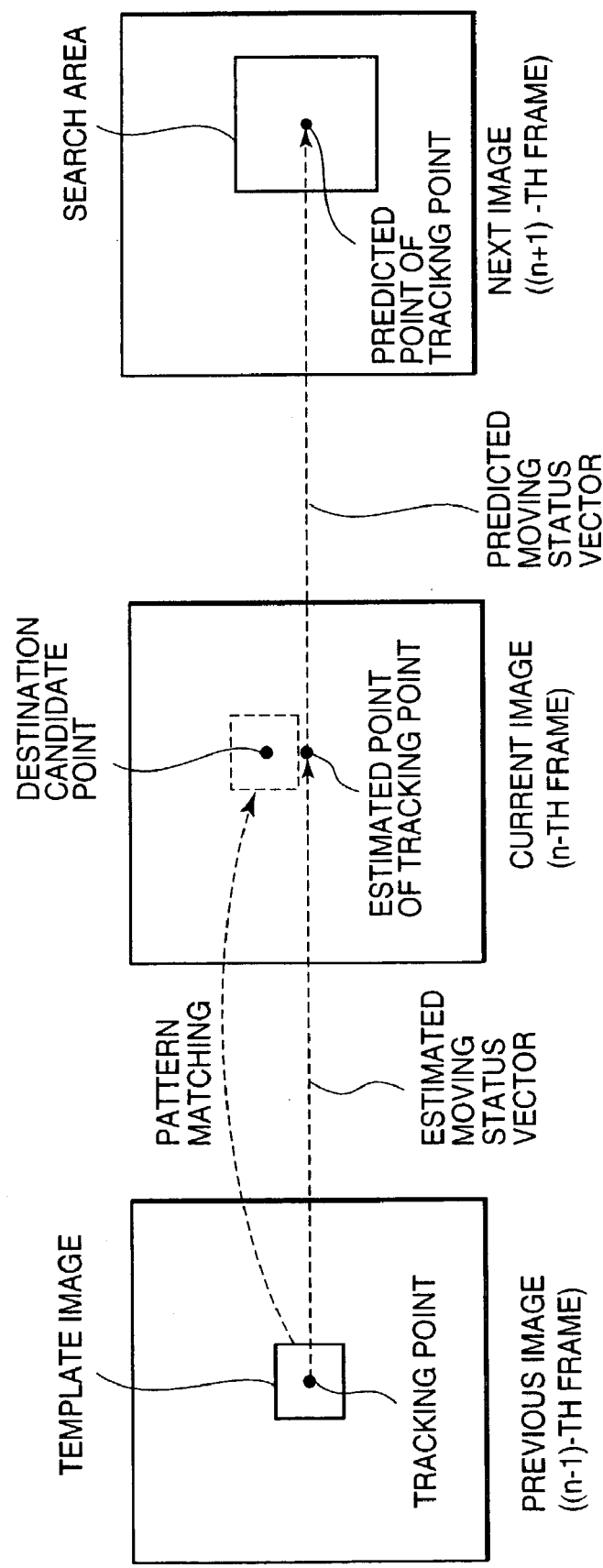
FIG. 4 is a schematic diagram of the positional relation of the estimated point and the predicted point of the tracking point among a previous image, a current image and a next image according to the first embodiment of the present invention.

FIG. 4 is a schematic diagram representing the positional relation of the estimated point and the predicted point of the tracking point among a previous image ((n−1)-th frame), a current image (n-th frame) and a next image ((n+1)-th frame) according to an embodiment of the invention. Assume that a coordinate of a tracking point and a template image of the tracking point is initially set on the previous image. Next, by pattern matching of the template image, a coordinate of a destination candidate point corresponding to the tracking point is detected from the current image. The coordinate of the destination candidate point is the observed value $r_n$. The observed value $r_n$ of the current image is assigned to the equation (2) of the Kalman filter, and the moving status vector $P_n$ of the tracking point on the current image is calculated (estimated).

As shown in the current image of FIG. 4, it is not always that the destination candidate point of the observed value is the same as the estimated point of the tracking point using the moving status vector $P_n$. Next, the moving status vector $P_n$ is assigned to the equation (1) of the Kalman filter, and a moving status vector $P_{n+1}$ of the tracking point on the next image is calculated (predicted).

As shown in the next image of FIG. 4, a predicted point of the tracking point is calculated by using the moving status vector $P_{n+1}$. In this case, a search area including the predicted point as a predetermined size is set on the next image, and information of the search area is supplied to the pattern matching unit 102.

In this way, tracking of the object is modeled as a linear probability system. By using the Kalman filter, the moving status of the object is sequentially estimated from the observed value of the destination candidate point. Briefly, the moving status vector $P_n$ of n-th frame is estimated by the observed value $r_n$ of n-th frame, and the moving status vector $P_{n+1}$ of (n+1)-th frame is predicted by the moving status vector $P_n$.

In the search area set unit 107, as shown in FIG. 4, a search area for the next image is determined by the predicted point of the tracking point using the moving status vector $P_{n+1}$. However, a weight may be calculated by using a function having a peak as the predicted point of the tracking point on the next image. Furthermore, by using a covariance of the estimated error of the Kalman filter, a distribution (spread) coefficient of the search area or the weight function may by determined.

In the first embodiment, the object tracking apparatus is used by a connection to the PC or WS. However, an LCD and a user interface such as a pointing device, or an image obtaining unit such as a camera, may be equipped in the object tracking apparatus. Furthermore, in the first embodiment, the initial coordinate data of the tracking points is received from outside the apparatus. However, a plurality of feature points may be extracted by corner detection method from the image and used as the tracking points without relying upon such outside data. The corner detection method is disclosed in Japanese Patent Disclosure (Kokai) 2000-194861.

As mentioned-above, in the object tracking apparatus of the first embodiment, the destination candidate points are extracted while a limitation of the positional relation among the tracking points is maintained. Accordingly, even if a destination candidate point is erroneously detected, the destination candidate point is corrected by using the original positional relation of the tracking points. As a result, in comparison with the case of tracking by using one point only, deviation of the point during tracking can be reduced.

Second Embodiment

Hereinafter, the second embodiment of the present invention is explained. The outline of the object tracking apparatus of the second embodiment is the same as the first embodiment and used by connecting to the PC or WS. Furthermore, a suitable use of the second embodiment is the same as the first embodiment. However, the component of the object tracking apparatus is not limited to the object tracking apparatus of the first embodiment. For example, an LCD and a user interface such as a pointing device, or an image obtaining unit such as a camera, may be equipped in the object tracking apparatus. Furthermore, instead of receiving coordinate data of the tracking points from outside the apparatus, a plurality of feature points may be extracted by corner detection method from the image and used as the tracking points.

In the object tracking apparatus of the second embodiment, at least three points on the object are tracked from image sequence data, and an affine parameter is calculated from coordinate data of the tracking points. The coordinate data of the tracking points includes an error caused by matching, and the affine parameter also includes the error. Accordingly, by applying the Kalman filter to a vector including this affine parameter (hereinafter, it is called an observed value of affine parameter) as an element, a more correct value of the affine parameter (hereinafter, it is called a true value of the affine parameter) is estimated. Then, by using the estimated true value of the affine parameter, destination coordinates of the tracking points are calculated, and movement of the tracking points are tracked.

In the second embodiment, the status transition matrix of the equation (1) and the observation matrix of the equation (2) are determined from the movement model of the object as a format to calculate the affine parameter. In the object tracking apparatus of the second embodiment, a moving, enlargement/reduction, skew and rotation of an area including the tracking points can be determined by using the affine parameter. Furthermore, the positional relation of the destination points of a deformed area is not usually torsional in space.

Figure 5:
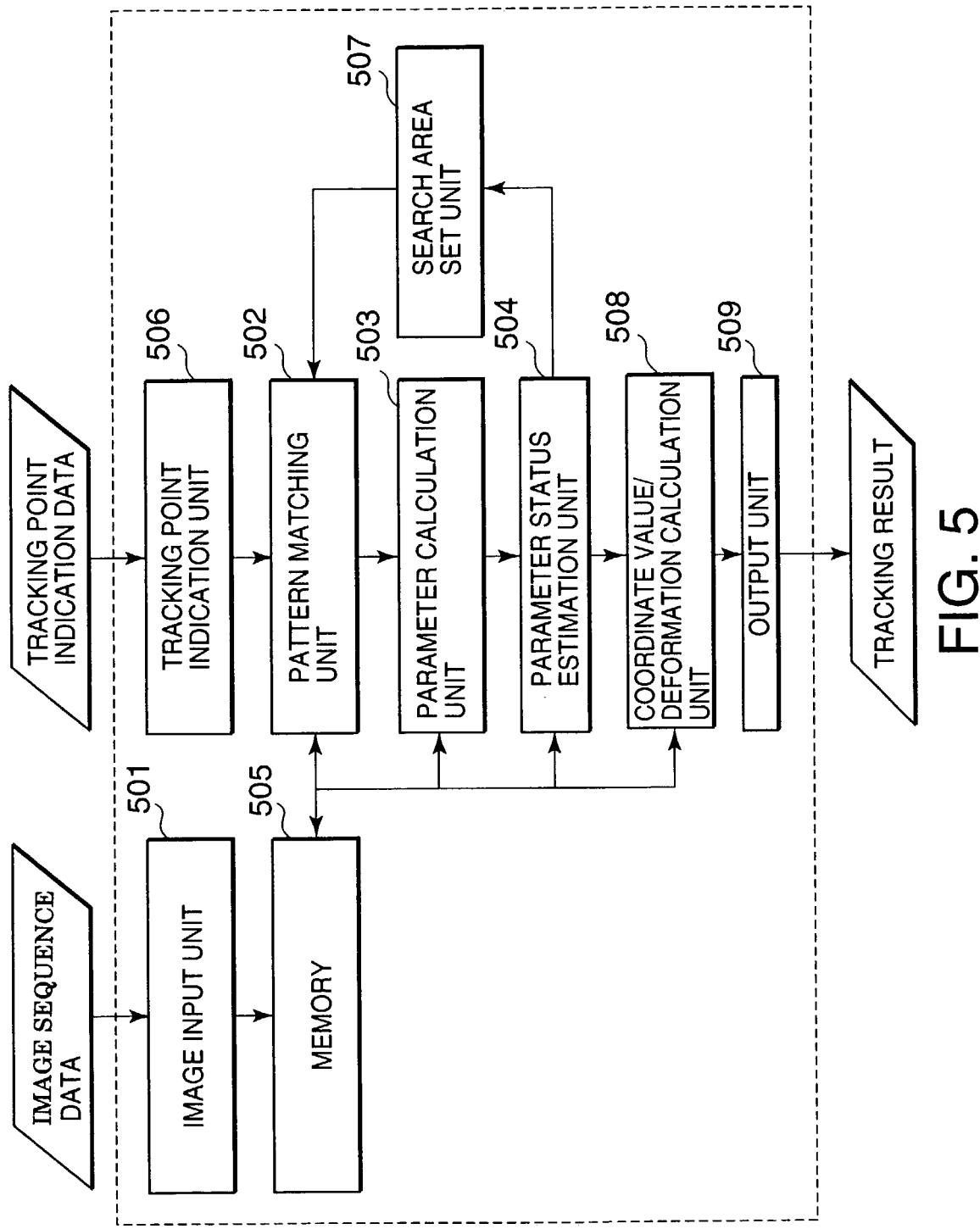
FIG. 5 is a block diagram of the object tracking apparatus according to a second embodiment of the present invention.

FIG. 5 is a block diagram of the object tracking apparatus of the second embodiment. Many components of the object tracking apparatus of the second embodiment are similar to the first embodiment. Accordingly, the different units are mainly explained.

The object tracking apparatus includes an image unit 501 to receive an input of image sequence data from outside the apparatus, a memory to store image data and information such as tracking points, a tracking point indication unit 506 to receive an input of coordinate data of the tracking points from outside the apparatus, and a pattern matching unit 502 to extract the destination candidate points of the tracking points by pattern matching. Furthermore, the apparatus includes a parameter calculation unit 503 to calculate an observed value $r_n$ of an affine parameter of a current image by using coordinate data of the tracking points and the destination candidate points. The apparatus also includes a parameter status estimation unit 504 to estimate an affine parameter of the current image and predict an affine parameter of the next image by using a Kalman filter. The apparatus further includes a search area set unit 507 to set a search area of destination candidate points of the tracking points on the next image by using the predicted affine parameter of the next image. A coordinate value/deformation calculation unit 508 of the apparatus calculates coordinates of the destination candidate points and a deformation quantity of area including the destination candidate points by using the estimated affine parameter of the current image. Finally, an output unit 509 of the apparatus outputs a tracking result to the PC or WS.

The memory 505 stores the image data, a template image, information such as each tracking point and the affine parameter. The image input unit 501, the pattern matching unit 502, the parameter calculation unit 503 and the parameter status estimation unit 504, can access information stored in the memory 505. The pattern matching unit 502, the parameter calculation unit 503 and the parameter status estimation unit 504, acquires data necessary for processing from the memory 505 and stores the processing result in the memory 505.

The parameter calculation unit 503 reads coordinates of tracking points initially set and coordinates of destination candidate points of the current image from the memory 505, calculates an affine parameter for converting the coordinates of tracking points to the coordinates of destination candidate points, and stores the affine parameter in the memory 505. This affine parameter is calculated by using the coordinates of the destination candidate points detected by pattern matching, i.e., an observed value of the coordinates of the destination candidate points. Accordingly, this affine parameter is called "the observed value of the affine parameter".

The parameter status estimation unit 504 reads the observed value of affine parameter of the current image from the memory 505, estimates a status vector of which element is a true value of the affine parameter of the current image, and predicts a status vector of which element is a true value of the affine parameter of the next image. The estimation and prediction of the affine parameter is executed by using a Kalman filter. The status transition matrix $F_n$ and the observation matrix $H_n$ are guided for calculation of the affine parameter from movement model of object. The predicted value of the affine parameter of the next image is used for converting the coordinates of the destination candidate points of the current image to coordinates of new destination candidate points of the next image. The estimated value of the affine parameter of the current image and the predicted value of the affine parameter of the next image are stored in the memory 505. The predicted value of the affine parameter of the next image is output to the search area set unit 507. Furthermore, the estimated value of the affine parameter of the current image is output to the coordinate value/deformation calculation unit 508.

The search area set unit 507 calculates a search area of the next image by using the predicted value of the affine parameter output from the parameter status estimation unit 504, and outputs information of the search area to the pattern matching unit 502. The pattern matching unit 502 executes pattern matching to detect new destination candidate points on the search area of the next image.

The coordinate value/deformation calculation unit 508 calculates coordinates of the destination candidate points each corresponding to each tracking points on the current image, and calculates deformation quantity between an area formed by the tracking points and an area formed by the destination candidate points on the current image. This calculation is executed by using the estimated value of the affine parameter of the current image.

Figure 6:
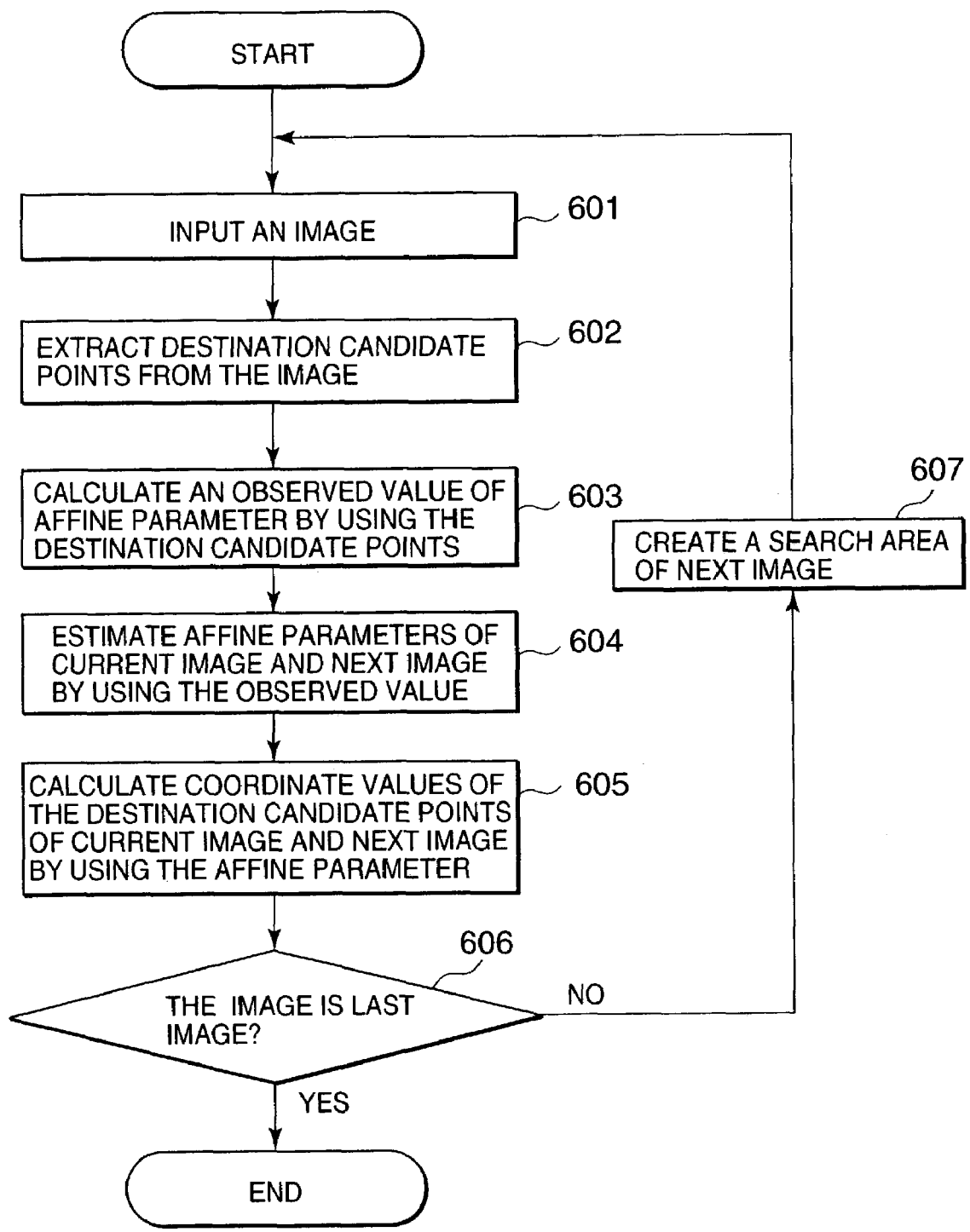
FIG. 6 is a flow chart of processing of the object tracking apparatus according to the second embodiment of the present invention.

FIG. 6 is a flow chart of processing of the object tracking apparatus of the second embodiment. Assume that coordinates of each tracking point are indicated at a timing of operation starting. First, each frame is obtained from image sequence data input from outside the apparatus and sequentially stored in the memory (step 601). The template matching of each tracking point is executed on a current image (current frame), and a coordinate of a destination candidate point corresponding to each tracking point is detected from the current image (step 602). Next, an affine parameter for converting coordinates of the tracking points to coordinates of the destination candidate points on the current image is calculated as the observed value (step 603). The estimated value of the affine parameter of the current image and the predicted value of the affine parameter of a next image (next frame) are calculated by applying a Kalman filter to the observed value (step 604). After this processing is executed for all frames of the image sequence data, the processing is completed (step 605). On the other hand, if a next frame of the image sequence data exists, a search area of the next image is set (step 606) and processing of step 601 is executed.

Next, calculation of the affine parameter by the parameter calculation unit 503 is explained. Assume that a coordinate of a tracking point on a previous image is $(x_n, y_n)$ and a coordinate of a destination candidate point corresponding to the tracking point on a current image is $(x_{n+1}, y_{n+1})$. Affine parameters "a, b, c, d, e, f" are represented as follows.

$$\begin{bmatrix} x_n + 1 \\ y_n + 1 \end{bmatrix} = \begin{bmatrix} a & b \\ c & d \end{bmatrix} \begin{bmatrix} x_n \\ y_n \end{bmatrix} + \begin{bmatrix} e \\ f \end{bmatrix} \quad (3)$$

Thus, there are six unknown numbers in the affine parameter. In the case of three tracking points, a strict solution of the affine parameter can be obtained. In the case of at least four tracking points, an approximation solution (for example, least square solution) of the affine parameter can be obtained. Accordingly, in the second embodiment, it is necessary to indicate at least three tracking points. However, in order to avoid an inconsistency of the positional relation among tracking points, it is desired to indicate at least four tracking points. In the case of indicating at least four tracking points, even if an inconsistency of the positional relation among tracking points occurs as a result of pattern matching, the inconsistency as error is eliminated by calculation of an approximation solution of the affine parameter. Briefly, automatically correcting the inconsistency is expected by using the affine parameter.

The parameter calculation unit 503 calculates the observed value of the affine parameter by solving the equation (3). In the affine parameter of the equation (3), "e" and "f" respectively represent a moving vector along X-direction and a moving vector along Y-direction, and "a", "b", "c" and "d" represents a deformation quantity such as enlargement/reduction and rotation of the polygon formed by at least three tracking points.

The parameter status estimation unit 504 respectively calculates a status vector of which element is the estimated value of a true affine parameter of the current image and a status vector of which element is the predicted value of a true affine parameter of the next image. In this case, the affine parameter "a, b, c, d, e, f" is used to calculate the observed value $r_n$ of the equation (2). By using the Kalman filter of the equations (1) and (2), the estimated status vector $P_n$ and the predicted status vector $P_{n+1}$ are calculated.

Figure 7:
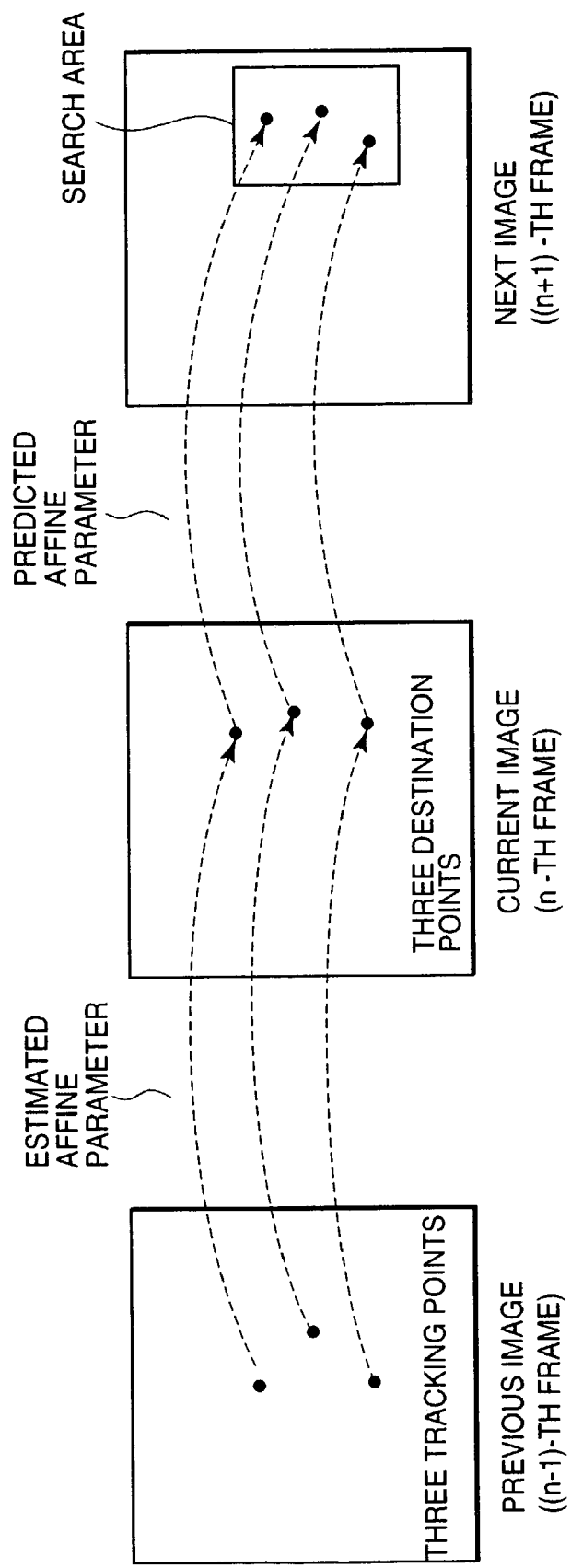
FIG. 7 is a schematic diagram of relation of affine transformation of a plurality of tracking points among the previous image, the current image and the next image according to the second embodiment of the present invention.

FIG. 7 is a schematic diagram of the relation of the affine transformation of three tracking points among a previous image ((n−1)-th frame), a current image (n-th frame) and a next image ((n+1)-th frame) according to an embodiment of the present invention. Assume that three tracking points are initially set on the previous image and three destination points are detected from the current image by pattern matching of the three tracking points. First, an affine parameter for converting the three tracking points to the three destination points is estimated by using a Kalman filter (equation (2)). Furthermore, an affine parameter for converting the three destination points to new three destination points of the next image is predicted by using the Kalman filter (equation (1)). As shown in the next image of FIG. 7, coordinates of new three destination points are calculated by using the predicted affine parameter, and a search area including the coordinates of new three destination points is set on the next image. Information of the search area is output to the pattern matching unit 502.

In the second embodiment, as shown in FIG. 7, movement of each tracking point is represented by a common affine parameter. Accordingly, a moving vector and deformation of a polygon formed by at least three tracking points can be calculated. Furthermore, even if there is an inconsistency of the positional relation among the destination candidate points as a result of pattern matching, in the case of at least four tracking points, the inconsistency is automatically corrected by calculation of the affine parameter. Accordingly, the positional relation among the destination points is not torsional in space. Furthermore, the Kalman filter is applied to the affine parameter. Accordingly, an arbitrary point of the object is tracked at a desirably high accuracy.

Third Embodiment

Hereinafter, the third embodiment of the present invention is explained. In the object tracking apparatus of the third embodiment, in the same way as the first and second embodiments, image sequence data and coordinate data of a tracking area output from the PC or WS is received, an affine parameter is calculated by tracking deformation and movement of the tracking area at a predetermined interval, and coordinates or a velocity of the tracking area is output as the tracking result to the PC or WS. In this case, a LCD and a user interface such as a pointing device, or an image obtaining unit such as a camera, may be equipped in the object tracking apparatus. Furthermore, instead of receiving coordinates of the tracking area from outside the apparatus, a plurality of feature points may be extracted by a corner detection method from the image, and an area surrounded by the plurality of feature points may be set as the tracking area.

The object tracking apparatus of the third embodiment has a function to track movement of a non-rigid body. Especially, in the medical area, in the case of obtaining image sequence of the heart, movement of an arbitrary area of the heart can be correctly tracked.

In the second embodiment, the affine parameter is commonly calculated by coordinates of tracking points and coordinates of destination points. However, in the object tracking apparatus of the third embodiment, first, an optimal affine parameter representing movement and deformation of the tracking area is selected from a plurality of affine parameters previously set. This optimal affine parameter includes error. Accordingly, a Kalman filter is applied to a vector of which element is the optimal affine parameter (it is called an observed value of the affine parameter) and more accurate value of the affine parameter (it is called a true value of the affine parameter) is estimated. Then, coordinates of destination area corresponding to the tracking area are calculated by using the estimated affine parameter. In this way, movement of the tracking area is sequentially tracked in dynamic image data.

In the object tracking apparatus of the third embodiment, the affine parameter representing movement and deformation of the tracking area is directly searched from a plurality of affine parameters previously set. Accordingly, in addition to effect of the second embodiment, a possibility that the positional relation among destination points of a deformed tracking area is inconsistent with the positional relation among tracking points of the original tracking area is extremely low, and the tracking area can be stably tracked over each frame of the image sequence data.

Figure 8:
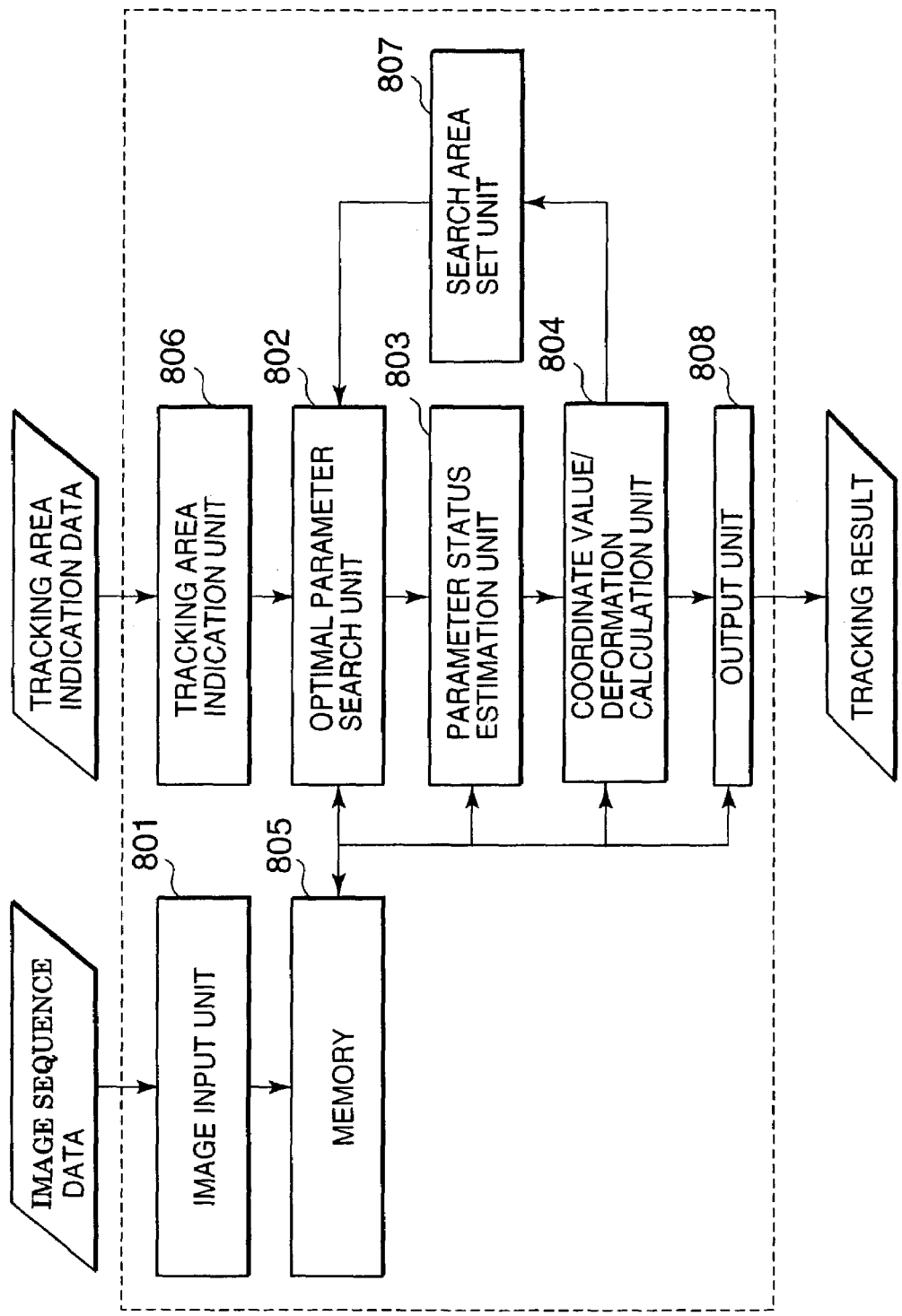
FIG. 8 is a block diagram of the object tracking apparatus according to a third embodiment of the present invention.

FIG. 8 is a block diagram of the object tracking apparatus of the third embodiment. As shown in FIG. 8, the object tracking apparatus includes an image input image unit 801 to receive image sequence data, a memory 805 to store input image data and information such as a tracking area, a tracking area indication unit 806 to receive input of coordinates of vertexes of the tracking area from a user, and an optimal parameter search unit 802 to search an observed value of the affine parameter representing moving and deformation of the tracking area by pattern matching of the image. Furthermore, the apparatus includes a parameter status estimation unit 803 to estimate a true affine parameter of the current image and predict the affine parameter of the next image by applying a Kalman filter to the observed value. The apparatus also includes a coordinate value/deformation calculation unit 804 to calculate deformation and coordinates of destination area corresponding to the tracking area on the current image by using the estimated affine parameter of the current image. Additionally, the apparatus includes a search area set unit 807 to determine a search area (parameter limit) of the affine parameter by using the predicted value of the affine parameter of the next image, and an output unit 808 to output the tracking result to the PC or WS.

The image input unit 801 receives an input of image sequence data from outside the apparatus and sequentially stores each frame of the image sequence data in the memory 805.

The memory 805 stores image data, affine parameters, an initial image (reference pattern) of a tracking area, coordinates of vertexes of the tracking area and so on. The image input unit 801, the optimal parameter search unit 802, the parameter status estimation unit 803 and the coordinate value/deformation calculation unit 804, can access the memory 805.

The tracking area indication unit 806 receives an input of coordinate data of vertexes of the tracking area from outside, and informs the coordinate data of vertexes of the tracking area to the optimal parameter search unit 802.

In response to input of the coordinate data of the tracking area from the tracking area indication unit 806, the optimal parameter search unit 802 creates a reference pattern by extracting an image of the tracking area from the current image, and stores the reference pattern with the coordinate of vertexes of the tracking area in the memory 805. Furthermore, the optimal parameter search unit 802 previously stores a plurality of affine parameters each suitably determined. Accordingly, the optimal parameter search unit 802 deforms the reference pattern by using each of the plurality of affine parameters, and creates a plurality of deformed pattern each corresponding to each affine parameter. Then, the optimal parameter search unit 802 compares each deformed pattern with a corresponding area of the current image, decides one deformed pattern to be the most similar to the corresponding area of the current image, and selects the affine parameter used for the one deformed pattern. This selected affine parameter is stored as an observed value of affine parameter of the current image in the memory 805. In this case, the deformed pattern having the largest correlation with the corresponding area is regarded as the one having the highest similarity.

The parameter status estimation unit 803 reads the observed value of the affine parameter of the current image from the memory 805. In the same way as the parameter status estimation unit 504 of the second embodiment, the parameter status estimation unit 803 calculates an estimated value of the true affine parameter of the current image by assigning the observed value to the equation (2) of the Kalman filter, and calculates a predicted value of the affine parameter of the next image by assigning the estimated value to the equation (1) of the Kalman filter. The estimated value of the true affine parameter of the current image and the predicted value of the affine parameter of the next image are stored in the memory 805. Furthermore, the predicted value of the affine parameter of the next image is output to the search area set unit 807.

The coordinate value/deformation calculation unit 804 reads the estimated value of the true affine parameter of the current image and coordinates of vertexes of the tracking area from the memory 805, and calculates coordinates of vertexes of a destination area corresponding to the tracking area on the current image. The coordinates of vertexes of the destination area on the current image are output to the output unit 808.

The search area set unit 807 calculates a search area of the affine parameter of the next image by using the predicted value of the affine parameter of the next image output from the parameter status estimation unit 803, and outputs the search area of the affine parameter to the optimal parameter search unit 802. This search area of the affine parameter is different from the search area of the first embodiment and the second embodiment. The search area of the affine parameter of the third embodiment is a parameter limit (parameter space) to select an optimal affine parameter from a plurality of affine parameters previously set. As shown in the equation (3), the affine parameter of two-dimensional image includes six free degrees, e.g., "a, b, c, d, e, f". The processing to search the optimal affine parameter represents a search in six-dimensional space, and the search time is largely required. Accordingly, the search area (parameter limit) of the affine parameter is reduced by using the predicted value of affine parameter of the next image in order to accelerate the search processing.

Figure 9:
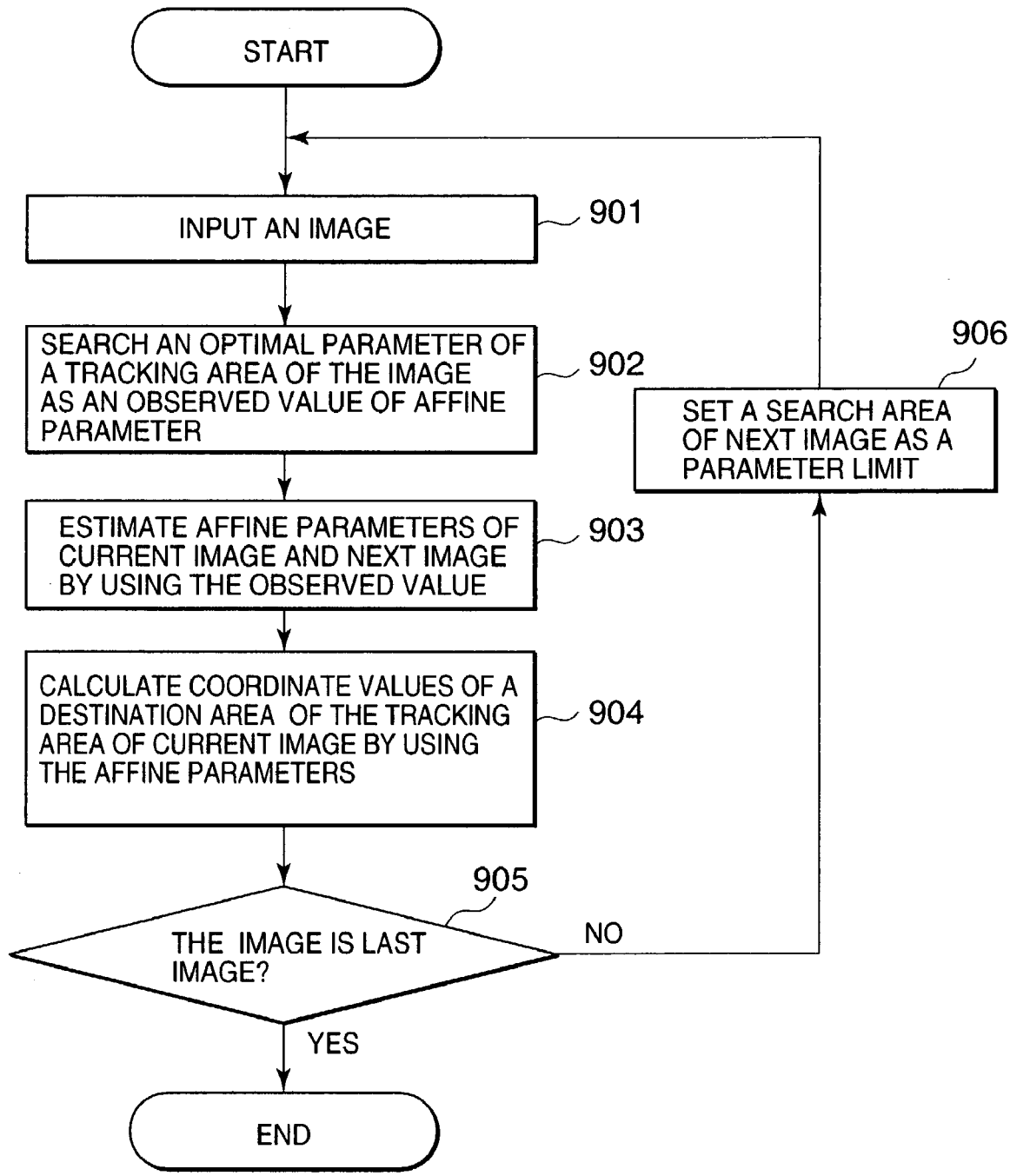
FIG. 9 is a flow chart of processing of the object tracking apparatus according to the third embodiment of the present invention.

FIG. 9 is a flow chart of processing of the object tracking apparatus of the third embodiment. Assume that coordinates of vertexes of the tracking area are indicated at a timing of operation starting. First, each frame of image sequence data is obtained from outside the apparatus and sequentially stored in the memory (step 901). A reference pattern of the tracking area is respectively deformed by using each of a plurality of affine parameters previously set. Each deformed pattern is compared with a corresponding pattern of a current image, and an affine parameter of one deformed pattern having the largest correlation with the corresponding pattern is selected as an observed value of the affine parameter (step 902). By assigning the observed value of the affine parameter to a Kalman filter, an estimated value of true affine parameter of the current image and a predicted value of affine parameter of the next image are calculated (step 903). By using the estimated value of affine parameter of the current image, coordinates of vertexes of a destination area corresponding to the tracking area and deformation degree of the destination area are calculated and output as the tracking result to the outside (step 904). In parallel with the processing of step 904, it is decided whether the tracking processing is completed for all frames of the image sequence data (step 905). If the tracking processing is completed for all frames, all processing of FIG. 9 is completed. On the other hand, in the case of existing a next frame in the memory, a search area as parameter limit of next image is set (step 906) and the processing of step 901 is executed.

Figure 10:
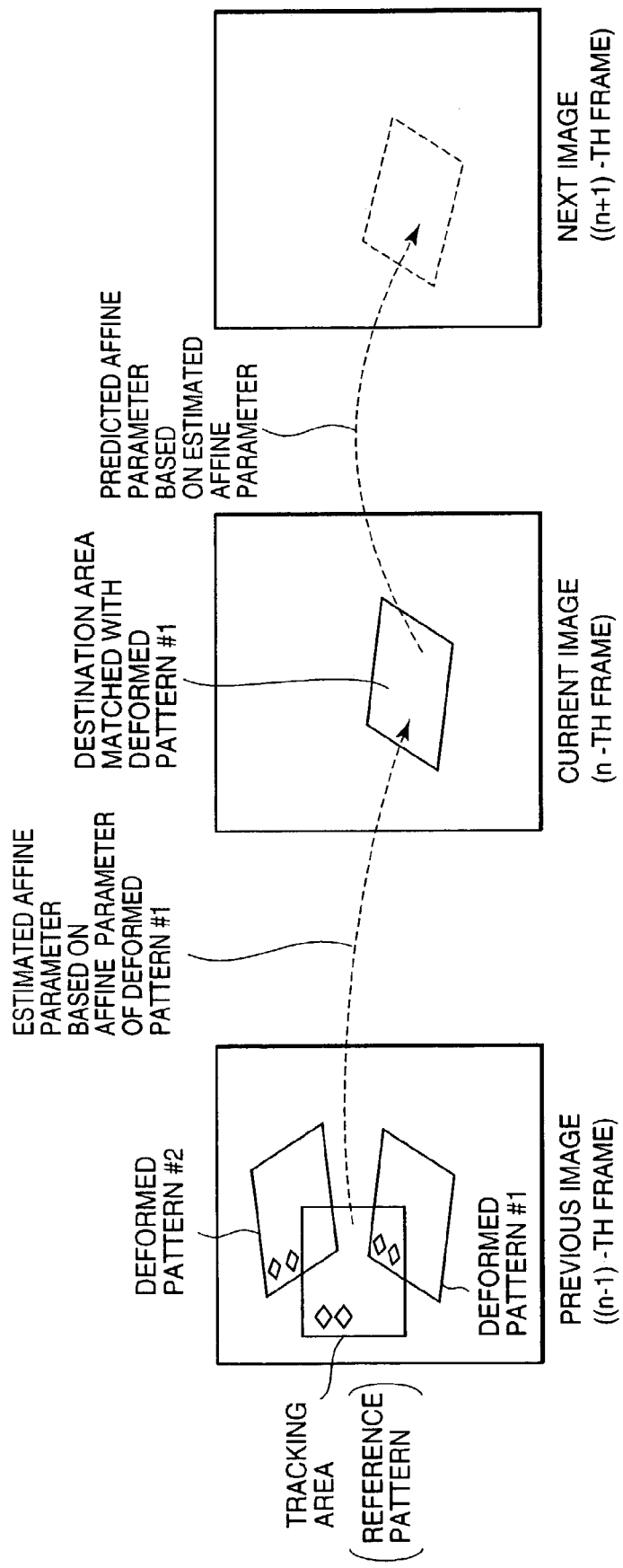
FIG. 10 is a schematic diagram of relation of affine transformation of a tracking area among the previous image, the current image and the next image according to the third embodiment of the present invention.

FIG. 10 is a schematic diagram of relation of affine transformation of the tracking area among a previous image ((n−1)-th frame), a current image (n-th frame) and a next image ((n+1)-th frame) according to an embodiment of the present invention. In order to simplify the explanation, assume that two affine parameters are previously set. First, a reference pattern of the tracking area is extracted from the previous image. The reference pattern is respectively deformed by each of the two affine parameters. As shown in the equation (3), transformation by an affine parameter represents movement and deformation of the original pattern. As a result, two deformed patterns #1 and #2 are created on the previous image. Next, each deformed pattern is compared with a corresponding area of the current image. The corresponding area is an original area of the current image of the same position as the deformed pattern of the previous image. In this case, assume that the deformed pattern #1 is matched with the corresponding area as the one with the highest similarity. Accordingly, the affine parameter used for the deformed pattern #1 is selected as an observed value of the affine parameter. This processing represents a search of the destination of the reference pattern from the current image.

Next, an estimated value of the affine parameter of the current image is calculated by assigning the observed value to the equation (2) of a Kalman filter, and a predicted value of the affine parameter of the next image is calculated by assigning the estimated value of affine parameter to the equation (1) of the Kalman filter. Last, the predicted value of affine parameter of the next image is used as a parameter limit to select an optimal affine parameter of the next image from the plurality of affine parameters. In this way, in the third embodiment, the affine parameter representing movement and deformation of the tracking area are directly searched from a plurality of affine parameters previously limited. Accordingly, a search of the optimal affine parameter can be realized at a desirably high accuracy.

As mentioned-above, in the present invention, even if the object in image sequence data is non-rigid body, a plurality of tracking points of the object can be sequentially tracked without problems from the inconsistency of positional relations of the plurality of tracking points.

For embodiments of the present invention, the processing of the present invention can be accomplished by a computer-executable program, and this program can be realized in a computer-readable memory device.

In embodiments of the present invention, the memory device, such as a magnetic disk, a floppy disk, a hard disk, an optical disk (CD-ROM, CD-R, DVD, and so on), an optical magnetic disk (MD, and so on) can be used to store instructions for causing a processor or a computer to perform the processes described above.

Furthermore, based on an indication of the program installed from the memory device to the computer, OS (operation system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device. The component of the device may be arbitrarily composed.

In embodiments of the present invention, the computer executes each processing stage of the embodiments according to the program stored in the memory device. The computer may be one apparatus such as a personal computer or a system in which a plurality of processing apparatuses are connected through the network. Furthermore, in the present invention, the computer is not limited to the personal computer. Those skilled in the art will appreciate that a computer includes a processing unit in an information processor, a microcomputer, and so on. In short, the equipment and the apparatus that can execute the functions in embodiments of the present invention using the program are generally called the computer.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. An object tracking apparatus, comprising:
an image input device inputting image sequence data;
a memory storing a first image and a second image as the image sequence data;
a tracking point indication unit configured to initially indicate a plurality of tracking points on the first image stored in said memory;
a pattern matching unit configured to compare a pattern of each tracking point of the first image with the second image stored in said memory, and to detect a plurality of destination candidate points from the second image, wherein each of the destination candidate points corresponds to each of the tracking points; and
a position inconsistency correction unit configured to link each tracking point with a plurality of segments so that none of the plurality of segments intersect, to analyze a positional relationship between each side and each vertex of each triangle formed by neighboring three of the segments of each tracking point, to link each destination candidate point with a plurality of segments so that none of the plurality of segments intersect, to analyze a positional relationship between each side and each vertex of each triangle formed by neighboring three of the segments of each destination candidate point, to decide whether a positional relationship of the plurality of destination candidate points is consistent with a positional relationship of the plurality of tracking points, and to correct at least one of the plurality of destination candidate points on the second image by using the positional relationship of the plurality of tracking points if the positional relationship of the plurality of destination candidate points is inconsistent with the positional relationship of the plurality of tracking points because of the at least one of the plurality of destination candidate points.

2. The object tracking apparatus according to claim 1, further comprising:
a moving status estimation unit configured to generate an estimated moving status vector of each tracking point by using position data of the plurality of destination candidate points, and to generate a predicted moving status vector of each tracking point on a third image stored in said memory by using the estimated moving status vector of each tracking point.

3. The object tracking apparatus according to claim 2, wherein said moving status estimation unit generates the estimated moving status vector and the predicted moving status vector by using a Kalman filter.

4. The object tracking apparatus according to claim 2, wherein each of the estimated moving status vector and the predicted moving status vector includes a coordinate value, a velocity and an acceleration of each tracking point.

5. The object tracking apparatus according to claim 2, further comprising:
a search area set unit configured to set a search area on the third image by using the predicted moving status vector of each tracking point, and to supply the search area to said pattern matching unit.

6. The object tracking apparatus according to claim 5, wherein the first image, the second image, and the third image are respectively a previous image, a current image, and a next image in a time series.

7. The object tracking apparatus according to claim 1, wherein said pattern matching unit extracts a template image as the pattern of each tracking point from the first image, calculates a similarity degree between the template image and each area of the second image, and detects the destination candidate point from an area of the second image having the highest similarity degree.

8. The object tracking apparatus according to claim 6, wherein said pattern matching unit compares a pattern of an estimated point of each tracking point of the second image with the search area of the third image, and detects a plurality of predicted points each corresponding to each estimated point from the search area of the third image.

9. The object tracking apparatus according to claim 1, wherein the positional relationship represents whether two vertices facing a common base of triangles are respectively located at the right side and the left side of the common base.

10. The object tracking apparatus according to claim 1,
if the positional relationship of the plurality of destination candidate points is inconsistent with the positional relationship of the plurality of tracking points,
wherein said position inconsistency correction unit creates an area formed by at least four segments in which a new destination candidate point does not cause inconsistency of the positional relationship, and searches the new destination candidate points from the area instead of the at least one of the plurality of destination candidate points.

11. The object tracking apparatus according to claim 4, further comprising:
an output device displaying an estimated point of each of the plurality of tracking points on the second image by using the estimated moving status vector of each tracking point.

12. An object tracking method, comprising:
inputting image sequence data;
storing a first image and a second image as the image sequence data in a memory;
initially indicating a plurality of tracking points on the first image stored in the memory;
comparing a pattern of each of the plurality of tracking points of the first image with the second image stored in the memory;
detecting a plurality of destination candidate points from the second-image, wherein each of the plurality of destination candidate points corresponds to each of the plurality of tracking points;
linking each of the plurality of tracking points with a plurality of segments so that none of the segments intersect;
analyzing a positional relation between each side and each vertex of each triangle formed by neighboring three of the segments of each tracking point;
linking each destination candidate point with a plurality of segments so that none of the segments intersect;
analyzing a positional relationship between each side and each vertex of each triangle formed by neighboring three of the segments of each destination candidate point;
deciding whether a positional relationship of the plurality of destination candidate points is consistent with a positional relationship of the plurality of tracking points; and
correcting at least one of the plurality of destination candidate points by using the positional relationship of the plurality of tracking points if the positional relationship of the plurality of destination candidate points is inconsistent with the positional relationship of the plurality of tracking points because of the at least one of the plurality of destination candidate points.

13. A computer readable medium storing program code for causing a computer to track an object in image sequence data, the program code comprising:

a first program code to input the image sequence data;
a second program code to store a first image and a second image as the image sequence data in a memory;
a third program code to initially indicate a plurality of tracking points on the first image stored in the memory;
a fourth program code to compare a pattern of each tracking point of the first image with the second image stored in the memory;
a fifth program code to detect a plurality of destination candidate points from the second image, wherein each of the plurality of destination candidate points corresponds to each of the tracking points;
a sixth program code to link each of the plurality of tracking points with a plurality of segments so that none of the segments intersect;
a seventh program code to analyze a positional relationship between each side and each vertex of each triangle formed by neighboring three of the segments of each tracking point;
an eighth program code to link each destination candidate point with a plurality of segments so that none of the segments intersect;
a ninth program code to analyze a positional relationship between each side and each vertex of each triangle formed by neighboring three of the segments of each destination candidate point;
a tenth program code to decide whether a positional relationship of the plurality of destination candidate points is consistent with a positional relationship of the plurality of tracking points; and
an eleventh program code to correct at least one of the plurality of destination candidate points by using the positional relationship of the plurality of tracking points if the positional relationship of the plurality of destination candidate points is inconsistent with the positional relationship of the plurality of tracking points because of the at least one of the plurality of destination candidate points.

14. The object tracking method according to claim 12, further comprising:
generating an estimated moving status vector of each of the plurality of tracking points by using position data of the plurality of destination candidate points; and
generating a predicted moving status vector of each tracking point on a third image stored in the memory by using the estimated moving status vector of each of the plurality of tracking points.

15. The object tracking method according to claim 14, wherein the estimated moving status vector and the predicted moving status vector are generated by using a Kalman filter.

16. The object tracking method according to claim 14, wherein each of the estimated moving status vector and the predicted moving status vector includes a coordinate value, a velocity, and an acceleration of each tracking point.

17. The object tracking method according to claim 14, further comprising:
setting a search area on the third image by using the predicted moving status vector of each tracking point.

18. The object tracking method according to claim 17, wherein the first image, the second image, and the third image are respectively a previous image, a current image, and a next image in a time series.

19. The object tracking method according to claim 12, wherein the comparing the pattern includes:
extracting a template image as the pattern of each of the plurality of tracking points from the first image; and calculating a similarity degree between the template image and each area of the second image, wherein the detecting the plurality of destination candidate points includes:

detecting the plurality of destination candidate points from the area of the second image having a highest degree of similarity.

20. The object tracking method according to claim 19, wherein the comparing the pattern includes:

comparing a pattern of an estimated point of each of the plurality of tracking points of the second image with a search area of a third image, and wherein the detecting the plurality of destination candidate points includes:

detecting a plurality of predicted points each corresponding to each estimated point from the search area of the third image.

21. The object tracking method according to claim 12, wherein the positional relationship represents whether two vertices facing a common base of two triangles are respectively located at the right side and the left side of the common base.

22. The object tracking method according to claim 12, wherein if the positional relationship of the plurality of destination candidate points is inconsistent with the positional relationship of the plurality of tracking points, the correcting at least one of the plurality of destination candidate points includes:

creating an area, the area formed by at least four segments, in which a new destination candidate point does not cause inconsistency of the positional relationship, and searching the new destination candidate point from the area instead of the at least one of the plurality of destination candidate points.

23. The object tracking method according to claim 16, further comprising:

displaying an estimated point of each of the plurality of tracking points on the second image by using the estimated moving status vector of each tracking point.

* * * * *